(No Model.)
G. E. RYCKMAN & M. TUCKER.
GRAPE VINE FASTENER.
No. 517,484. Patented Apr. 3, 1894.
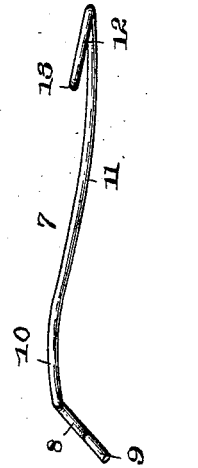
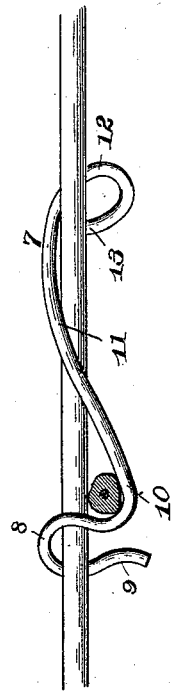
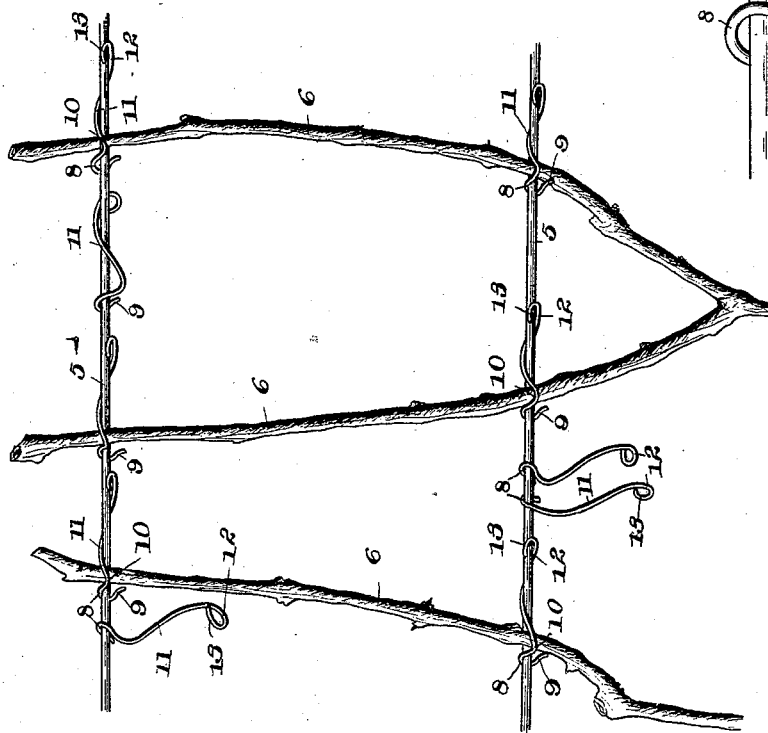
Witnesses
Inventors
Garrett E. Ryckman,
& Major Tucker,
Attorneys

UNITED STATES PATENT OFFICE.

GARRETT E. RYCKMAN AND MAJOR TUCKER, OF BROCTON, NEW YORK.

GRAPE-VINE FASTENER.

SPECIFICATION forming part of Letters Patent No. 517,484, dated April 3, 1894.

Application filed April 24, 1893. Serial No. 471,656. (No model.)

*To all whom it may concern:*

Be it known that we, GARRETT E. RYCKMAN and MAJOR TUCKER, citizens of the United States, residing at Brocton, in the county of Chautauqua and State of New York, have invented a new and useful Grape-Vine Fastener, of which the following is a specification.

Our invention relates to improvements in fasteners or keepers for securing grape-vines or other running plants to supporting trellises; and it has for its objects, to provide a device embodying a construction which will admit of its ready placement upon or being removable from a trellis wire; to provide a device which, when disengaged from the plant or vine to permit pruning, will remain suspended upon the trellis wire; to provide a device which, when engaged with the vine or plant, will hold the latter securely against vibration when affected by wind, &c.; and to provide a fastener of such construction that it will yield to the expanding growth of the vine or plant in order to avoid injury to the latter.

Further objects and advantages of our invention will appear hereinafter, and the novel features thereof will be particularly pointed out in the appended claims.

In the drawings—Figure 1 is a perspective view showing a portion of a trellis and vines extending thereover, a number of fasteners or keepers being shown connected to the trellis and arranged in operative and disengaged positions. Fig. 2 is a detail view of a fastener embodying our invention. Fig. 3 is a detail view in plan.

Similar numerals of reference indicate corresponding parts in all the figures of the drawings.

Referring to Fig. 1, 5 designates the horizontal wires of the trellis and 6 the portions of a grape-vine or similar plant which are secured to the trellis wires by means of our improved fastener 7.

The construction of the fastener embodies a terminal supporting hook 8, which is designed to be engaged with a trellis wire, as shown in Fig. 1, one terminal of such hook being flared or bent outwardly, as shown at 9, to facilitate the engagement of the hook with such trellis wire. Contiguous to this terminal hook and formed as a continuation of the inner side of the same is a bend 10, which is designed to pass around the grape-vine or other plant to hold the latter in contact with the trellis wire. This bend 10 curves gradually from the side of the hook 8 and its opposite side is extended and prolonged to form a spirally-twisted arm 11 which passes over, around and under the trellis wire and terminates in a loop 12 which is formed by bending the terminal of the arm upon itself, such terminal being free and spaced from the body portion of the arm and in position to engage or bear against the side of the trellis wire. This terminal 13 of the loop is deflected or bent out of the plane of the body portion of the arm 11 in order to insure a firm bearing against the surface of the trellis wire. The fastener is preferably made of resilient wire in order to produce a slight clamping action upon the vine engaged thereby, and thus, when the fastener is arranged in its operative position, the engagement of the terminal hook with the trellis wire and of the contiguous bend with the vine causes the spirally-twisted arm to have a tendency to spring forwardly or toward that side of the plane of the trellis upon which the vine is arranged. Therefore, in engaging the free end of the fastener with the trellis wire, in order to secure it in its operative position, the spiral arm must be bent or sprung downwardly and then forwardly at its free end until the terminal of the loop 12 passes the plane of the front surface of the trellis wire, when the end of the arm will spring upwardly a sufficient distance to cause the terminal 13 to engage the trellis wire. In this way the terminal 13 forms a stop or detent to engage the trellis wire and hold the free end of the fastener in position. The mouth or open side of the retaining hook 8 is of less width than the trellis wire and hence the outer or free side of such hook must be sprung outwardly in order that the trellis wire may be admitted into the hook. Therefore, when the free end of the fastener is disengaged from the trellis wire in order to permit of retraining or pruning the vine, such free end will swing down into a pendent position and the fastener will be supported upon the trellis wire by means of the retaining hook. In this way there is no necessity for the entire disengagement of the fastener from the trellis, and hence the liability of dropping and losing the fasteners is avoided. The object in extending or prolonging the arm 11 is to enable the fastener to accommodate stalks of various sizes, such arm being sufficiently yielding to permit of increasing the space inclosed by the bend 10 and the adjacent portion of the trellis wire. This would be impossible if the arm 11 were made of only sufficient length to extend directly around and under the trellis wire and engage the latter adjacent to the vine or plant.

Reference to Fig. 2 of the drawings will show that the plane of the hook 8 is at an angle to the plane of the bend 10, the outer or free side of such hook being depressed in order to enable it to lie under the trellis wire while the bend occupies a horizontal plane which is tangential to the upper side of the trellis wire. The free end of the spirally-twisted arm contacts at a point adjacent to the terminal loop 12 with the under side of the trellis wire, and by reason of the downward bending of such arm, when engaging with the trellis wire, the tendency of such free end is to rise, and hence the stop or terminal 13 is held firmly in engagement with the trellis wire.

From the above description it will be readily seen that the vine or plant is held from vibration and enabled to resist the action of a violent wind, and at the same time such vine or plant may be quickly and easily released by a slight outward pressure upon the terminal loop 12. Such pressure must be sufficient, merely, to depress the stop or terminal 13 below the plane of the trellis wire when the resiliency of the arm 11 will throw the fastener into its disengaged position, as shown clearly in Fig. 1.

In the above description we have stated that the bend 10 occupies a horizontal plane which is tangential to the upper side of the trellis wire, but it will be understood that such bend may be arranged at any desired angle to the horizontal plane in order to accommodate irregularity of shape in the vine or plant secured, and, if necessary, the position of the fastener may be reversed to cause such bend to lie under instead of over the trellis wire.

Having described our invention, what we claim is—

1. A fastener or clamp for grape-vines, &c., having a terminal retaining hook the mouth of which is smaller than the diameter of the trellis wire, with which it is engaged, whereby the fastener is not detached from the trellis wire by the disengagement of the vine, a bend to embrace the vine, and temporary securing devices for the free end of the fastener, substantially as specified.

2. A fastener or clamp for grape-vines, &c., having a terminal retaining hook, a contiguous bend, and a spirally-twisted arm provided at its free end with a loop, the free terminal of which is deflected or bent out of the plane of such loop, substantially as specified.

3. A fastener or clamp for grape-vines, &c., having a bend 10, a retaining hook connected to and integral with one arm of such bend and arranged in a plane at an angle to that of the bend, and a spirally-twisted arm 11 connected to and integral with the other arm of said bend and provided at its extremity with a terminal or stop which is arranged out of the plane of the end of the arm, substantially as specified.

In testimony that we claim the foregoing as our own we have hereto affixed our signatures in the presence of two witnesses.

GARRETT E. RYCKMAN.
MAJOR TUCKER.

Witnesses.
ANDREW J. SKINNER,
RANSOME HAIGHT.